(12) United States Patent
Ki et al.

(10) Patent No.: US 9,792,227 B2
(45) Date of Patent: Oct. 17, 2017

(54) HETEROGENEOUS UNIFIED MEMORY

(71) Applicants: Yang Seok Ki, Palo Alto, CA (US); Sheng Qiu, San Jose, CA (US)

(72) Inventors: Yang Seok Ki, Palo Alto, CA (US); Sheng Qiu, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 410 days.

(21) Appl. No.: 14/547,126

(22) Filed: Nov. 18, 2014

(65) Prior Publication Data

US 2016/0055097 A1    Feb. 25, 2016

Related U.S. Application Data

(60) Provisional application No. 62/039,399, filed on Aug. 19, 2014.

(51) Int. Cl.
| G06F 12/12 | (2016.01) |
| G06F 12/123 | (2016.01) |
| G06F 12/0871 | (2016.01) |
| G06F 12/02 | (2006.01) |

(52) U.S. Cl.
CPC ........ G06F 12/123 (2013.01); G06F 12/0871 (2013.01); *G06F 12/0238* (2013.01); *G06F 2212/1044* (2013.01); *G06F 2212/1048* (2013.01); *G06F 2212/225* (2013.01); *G06F 2212/282* (2013.01); *G06F 2212/401* (2013.01); *G06F 2212/7205* (2013.01); *G06F 2212/7208* (2013.01)

(58) Field of Classification Search
CPC ............... G06F 12/123; G06F 12/0871; G06F 2212/7208; G06F 2212/7205; G06F 2212/401; G06F 12/0238; G06F 2212/225; G06F 2212/1044; G06F 2212/1048; G06F 2212/282
USPC ......................... 711/160, 151, 158, 159, 165
See application file for complete search history.

(56) References Cited

U.S. PATENT DOCUMENTS

| 8,621,148 | B2 | 12/2013 | Eilert |
| 9,460,008 | B1 * | 10/2016 | Leshinsky ......... G06F 17/30185 |
| 2012/0117304 | A1 | 5/2012 | Worthington et al. |
| 2013/0042057 | A1 | 2/2013 | Sinclair et al. |
| 2013/0290599 | A1 | 10/2013 | Jain et al. |
| 2013/0329491 | A1 | 12/2013 | Chang et al. |

\* cited by examiner

*Primary Examiner* — Jasmine Song
(74) *Attorney, Agent, or Firm* — Renaissance IP Law Group LLP

(57) ABSTRACT

Inventive aspects include a heterogeneous unified memory section, which includes an extended unified memory space across a plurality of physical heterogeneous memory modules. A cold page reclamation logic section can receive and prioritize cold pages from a system memory. The cold pages can include a first subset of memory pages having a first type of memory data and a second subset of memory pages having a second type of memory data. For example, the cold pages can include anon-type memory pages and file-type memory pages. A dynamic tuning logic section can manage space allocation within the extended unified memory space. An intelligent page sort logic section can distribute the cold pages among different pools of physical heterogeneous memory modules based on varying characteristics of the pools, and based on the assigned priorities.

18 Claims, 13 Drawing Sheets

HETEROGENEOUS UNIFIED MEMORY

RELATED APPLICATION DATA

This application claims the benefit of U.S. patent application Ser. No. 62/039,399, filed Aug. 19, 2014, which is hereby incorporated by reference.

BACKGROUND

The present inventive concepts relate to computerized memory interface techniques, and more particularly, to a heterogeneous unified memory system and method.

Conventionally, the main system memory of a computer system is dynamic random-access memory (DRAM), which is used to provide fast access to active data for applications or file systems. When the computer system needs more memory resources and the DRAM is full, inactive or "cold" pages in memory are moved out of the DRAM.

There are different types of memory pages, which are conventionally managed by different subsystems. For inactive anon-type memory pages (i.e., user stack or heap pages), a swap subsystem is used, which manages a so-called "swap space." Separately, for inactive file-type memory pages (i.e., file system data or pages), a disk cache subsystem is used, which manages formatted block caches. Using conventional techniques, it is not possible to leverage the physical space or share information between the two subsystems. When the behavior of applications or input/output (I/O) patterns change, or when the swap subsystem and/or disk cache subsystem need to be adjusted, a reconfiguration of the physical space for each subsystem is often necessary, which usually requires a hard shutdown and reboot of the computer system. Such techniques are not flexible, convenient, or scalable. Embodiments of the inventive concept address these and other limitations in the prior art.

BRIEF SUMMARY

Embodiments of the inventive concept may include a heterogeneous unified memory section. The heterogeneous unified memory section can include an extended unified memory space across a plurality of physical heterogeneous memory modules. The heterogeneous unified memory section can include a cold page reclamation logic section configured to receive and prioritize a plurality of cold pages from a system memory. The plurality of cold pages can include a first subset of memory pages having a first type of memory data and a second subset of memory pages having a second type of memory data. The heterogeneous unified memory section can include a dynamic tuning logic section configured to manage space allocation within the extended unified memory space between the first subset of memory pages having the first type of memory data and the second subset of pages having the second type of memory data. The heterogeneous unified memory section can include an intelligent page sort logic section configured to distribute the plurality of cold pages among at least a first pool of memory modules from among the plurality of physical heterogeneous memory modules and a second pool of memory modules from among the plurality of physical heterogeneous memory modules. The first pool of memory modules can have a first set of characteristics, and the second pool of memory modules can have a second set of characteristics.

In some embodiments, the first type of memory data corresponds to anon-type memory pages and the second type of memory data corresponds to file-type memory pages. In some embodiments, the extended unified memory space includes a single unified logical memory space that spans the plurality of physical heterogeneous memory modules, and that is configured to store the anon-type memory pages and the file-type memory pages. The plurality of physical heterogeneous memory modules can include at least one of a spin-transfer torque magnetoresistive random-access memory (STT MRAM), a solid state drive (SSD), a flash memory (e.g., NAND-flash), a resistive type memory, a phase change memory (PCM), or a dynamic random-access memory (DRAM).

Embodiments of the inventive concept can include a computer-implemented method for managing an extended unified memory space across a plurality of physical heterogeneous memory modules. The method can include receiving, by a cold page reclamation logic section, an evicted cold page from a system memory. The method can include assigning, by the cold page reclamation logic section, a priority to the evicted cold page. The method can include selecting, by an intelligent page sort logic section, one of a first pool of memory modules from among the plurality of physical heterogeneous memory modules or a second pool of memory modules from among the plurality of physical heterogeneous memory modules based at least on a first set of characteristics of the first pool of memory modules and a second set of characteristics of the second pool of memory modules, and based at least on the assigned priority of the evicted cold page. The method can include selecting a target module from among the selected pool of memory modules. The method can include determining, by the intelligent page sort logic section, whether the evicted cold page has a first type of memory data or a second type of memory data. The method can include determining, by the intelligent page sort logic section, whether the extended unified memory space is full or not full. The method can include in response to determining that the evicted cold page has the first type of memory data and that the extended unified memory space is not full, allocating a memory page on the target memory module and writing the evicted cold page having the first type of memory data to the target memory module. The method can include in response to determining that the evicted cold page has the second type of memory data and that the extended unified memory space is not full, allocating a memory page on the target memory module and writing the evicted cold page having the second type of memory data to the target memory module.

Embodiments of the inventive concept can include computer-implemented method for managing an extended unified memory space across a plurality of physical heterogeneous memory modules. The method can include receiving a target read page from a system memory. The method can include determining, by an intelligent page sort logic section, whether the target read page corresponds to an anon-type memory page or a file-type memory page. The method can include in response to determining that the target read page corresponds to the anon-type memory page: retrieving a page table, determining whether the anon-type memory page is located in a system memory or in the extended unified memory space based on the page table, and in response to determining that the anon-type memory page is located in the extended unified memory space, transferring the anon-type memory page from the extended unified memory space to the system memory. The method can include in response to determining that the target read page corresponds to the file-type memory page: retrieving a file address space, determining whether the file-type memory page is located in the system memory or in the extended unified memory space based on the retrieved file address space, and in response to determining that the file-type memory page is located in the extended unified memory space, transferring the file-type memory page from the extended unified memory space to the system memory.

Certain of the inventive features may be best achieved by implementing them in association with a processor such as within ARM processor core. Other types of memory modules, processors, application specific integrated circuits (ASICs), and/or firmware can implement the inventive principles disclosed herein. The inventive concepts may be implemented within processors and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first power switch cell could be termed a second power switch cell, and, similarly, a second power switch cell could be termed a first power switch cell, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a heterogeneous unified memory section that can be configured to explicitly manage space allocation and/or deallocation for different types of inactive or "cold" pages on an extended unified memory space that encompasses multiple physical heterogeneous memory modules. The heterogeneous unified memory section can also initiate and track data transfers between system memory (e.g., DRAM) and the extended unified memory space. Moreover, the heterogeneous unified memory section can analyze space utilization requests among different types of inactive pages and shrink and/or expand the space being allocated accordingly. As a result, different running applications and input/output (I/O) workloads can be automatically accommodated.

Figure 1:
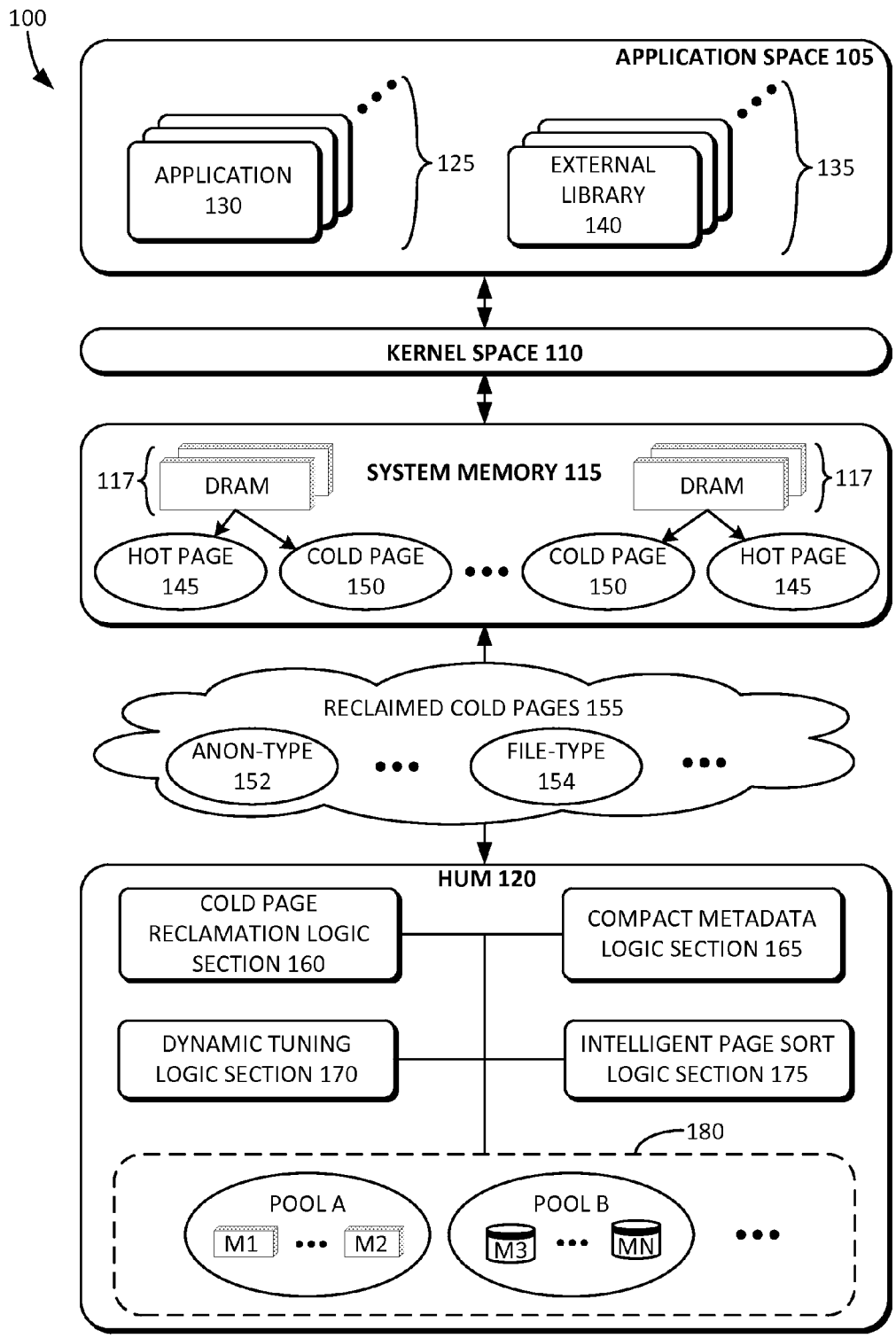
FIG. 1 is an example block diagram of a system stack including an application space, a kernel space, a system memory, and a heterogeneous unified memory section, in accordance with embodiments of the inventive concept.

FIG. 1 is an example block diagram of a system stack 100 including an application space 105, a kernel space 110, a system memory 115, and a heterogeneous unified memory section 120, in accordance with embodiments of the inventive concept.

The application space 105 can include one or more applications 125, including application 130, which can communicate with the kernel space 110. In addition, the application space 105 can include one or more external libraries 135, including external library 140, which can communicate with the one or more applications 125 and/or the kernel space 110. The kernel space 110 can include, for example, a Linux® kernel, although it will be understood that other suitable operating system kernels can be used without departing from the inventive concept disclosed herein.

The system memory 115 can include one or more dynamic random-access memory (DRAM) modules 117, which can store hot pages 145 and cold pages 150. The hot pages 145 are memory pages that have been recently accessed by the applications 125 or the external libraries 135. The cold pages 150 are essentially inactive memory pages that have not recently been accessed by the applications 125 or the external libraries 135.

The heterogeneous unified memory section 120 can include an extended unified memory space 180 across multiple physical heterogeneous memory modules (e.g., M1, M2, M3 through MN), which can be arranged in pools (e.g., pool A, pool B, etc.), as further described below. The extended unified memory space 180 can include a single unified logical memory space 180 that spans the physical heterogeneous memory modules (e.g., M1, M2, M3 through MN), and that is configured to store anon-type memory pages 152 and file-type memory pages 154. In some embodiments, the extended unified memory space 180 is physically and/or logically separate from the system memory 115. In an alternative embodiment, the extended unified memory space 180 includes at least a portion of the system memory 115.

The heterogeneous unified memory section 120 can include a cold page reclamation logic section 160 to receive and prioritize cold pages 155 from the system memory 115. The cold pages 155 can include a first subset of memory pages having a first type of memory data (e.g., 152) and a second subset of memory pages having a second type of memory data (e.g., 154). The first type of memory data 152 can be anon-type memory pages (i.e., user stack or heap pages). The second type of memory data 154 can be file-type memory pages (i.e., file system data or pages). The cold page reclamation logic section 160 can assign a priority to each of the cold pages 155 and/or to the underlying pools or physical heterogeneous memory modules (e.g., M1, M2, M3, through MN).

The heterogeneous unified memory section 120 can include a dynamic tuning logic section 170 to manage space allocation within the extended unified memory space 180 between the first subset of memory pages having the first type of memory data 152 and the second subset of pages having the second type of memory data 154, as further described below.

The heterogeneous unified memory section 120 can include an intelligent page sort logic section 175 to distribute, based at least on the assigned priority, the cold pages 155 among at least a first pool (e.g., pool A) of memory modules from among the physical heterogeneous memory modules (e.g., M1, M2, M3 through MN) and a second pool (e.g., pool B) of memory modules from among the physical heterogeneous memory modules (e.g., M1, M2, M3 through MN). It will be understood that the cold pages 155 can be distributed among three or more pools of memory modules from among the physical heterogeneous memory modules. The first pool of memory modules (e.g., pool A) can have a first set of characteristics and the second pool of memory modules (e.g., pool B) can have a second set of characteristics. For example, the first and second sets of characteristics can include performance characteristics, security characteristics, lifetime characteristics, wear resistance characteristics, power consumption characteristics, characteristics pertaining to the persistency of data in view of power failures, throughput characteristics, latency characteristics, or the like. The first set of characteristics associated with pool A can be different in whole or in part from the second set of characteristics associated with another pool, such as pool B. The intelligent page sort logic section 175 can select a pool and/or a particular physical memory module that provides a match to the data being written for allocation and writing of the data according to characteristics of the underlying memory module and/or the data's characteristics.

The heterogeneous unified memory section 120 can include a compact metadata logic section 165. The compact metadata logic section 165 can compress different modified parts within metadata pages into a single compacted metadata page, and store the single compacted metadata page in the extended unified memory space 180, as further described below.

Within the heterogeneous unified memory 120, the extended unified memory space 180 can be uniformly managed, which need not have explicit utilization partitions between anon-type memory pages and file-type memory pages. To achieve this, the heterogeneous unified memory 120 can internally identify the data types and mark the allocated entries differently for anon-type memory pages 152 and file-type memory pages 154.

As shown in FIG. 1, the extended unified memory 180 can be managed across different storage pools (pool A, pool B, etc.) according to their different characteristics. For different storage pools, the heterogeneous unified memory 120 can assign different priority values to the storage pools and/or to the incoming memory pages. Based on the assigned priorities, a particular pool and target memory module can be selected to allocate space. In some embodiments, a higher priority pool or memory module is preferred for new memory allocations. For each individual memory module, the space can be divided into 4 KB pages or blocks. The heterogeneous unified memory 120 can explicitly mark the pages or block as ANON_BLK (used by an ANON_PAGE) or FILE_BLK (used by a FILE_PAGE) if occupied.

Figure 2:
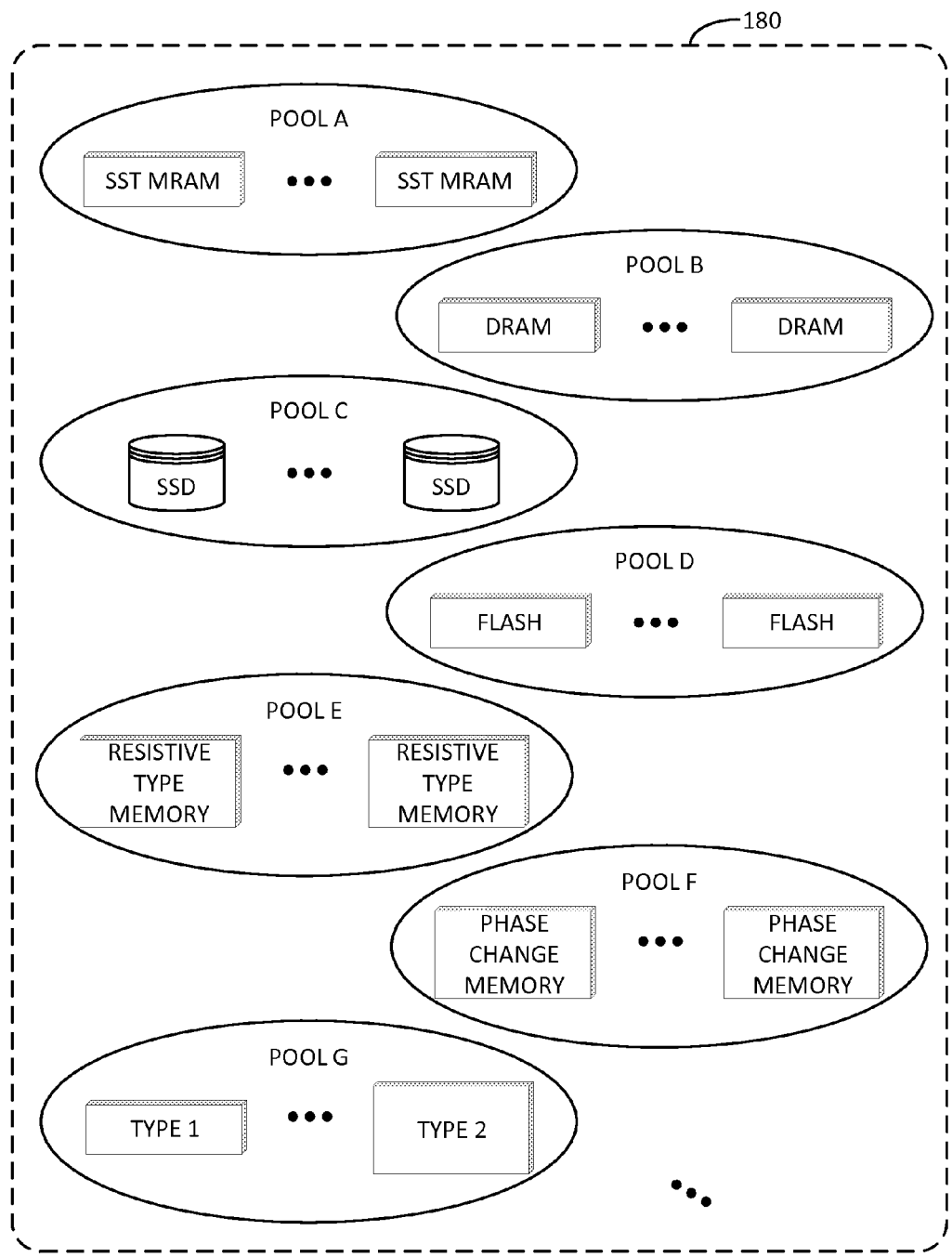
FIG. 2 is an example diagram of various examples of physical heterogeneous memory modules that can be associated with the heterogeneous unified memory section of FIG. 1.

FIG. 2 is an example diagram of various examples of physical heterogeneous memory modules within the unified memory space 180, which is associated with the heterogeneous unified memory section 120 of FIG. 1. The physical heterogeneous memory modules can include at least one non-volatile and/or volatile memory modules. For example, the unified memory space 180 can include one or more of pools A, B, C, D, E, F, or G. Each pool can have grouped within it physical memory modules that have the same or similar characteristics. For example, pool A can include one or more spin-transfer torque magnetoresistive random-access memory (STT MRAM) modules. Pool B can include, for example, one or more dynamic random-access memory (DRAM) modules. Pool C can include, for example, one or more solid-state drive (SSD) modules. Pool D can include, for example, one or more flash (e.g., NAND-flash) memory modules. Pool E can include, for example, one or more resistive type memory modules. Pool F can include, for example, one or more phase change memory (PCM) modules. Pool G can include, for example, two or more different types of modules (e.g., type 1 and type 2). In other words, each pool can have the memory modules having the same type and same characteristics, or memory modules having different types and similar characteristics.

Each pool can have a set of characteristics associated with it, such as high performance, low latency, high security, high durability, persistent storage, and so forth. The memory pages can be allocated and written to the various physical heterogeneous memory modules based on the underlying characteristics of the memory modules and that of the data contained within the memory pages. For example, an anon-type memory page can require higher performance and security than a file-type memory page. Certain types of anon-type memory pages can require greater security and performance than other types of memory pages. File-type memory pages can also need secure storage, and at times, highly performing storage. Finding the best fit for each type of memory page and type of underlying storage can be managed by the heterogeneous unified memory 120, and can evolve over time.

Figure 3:
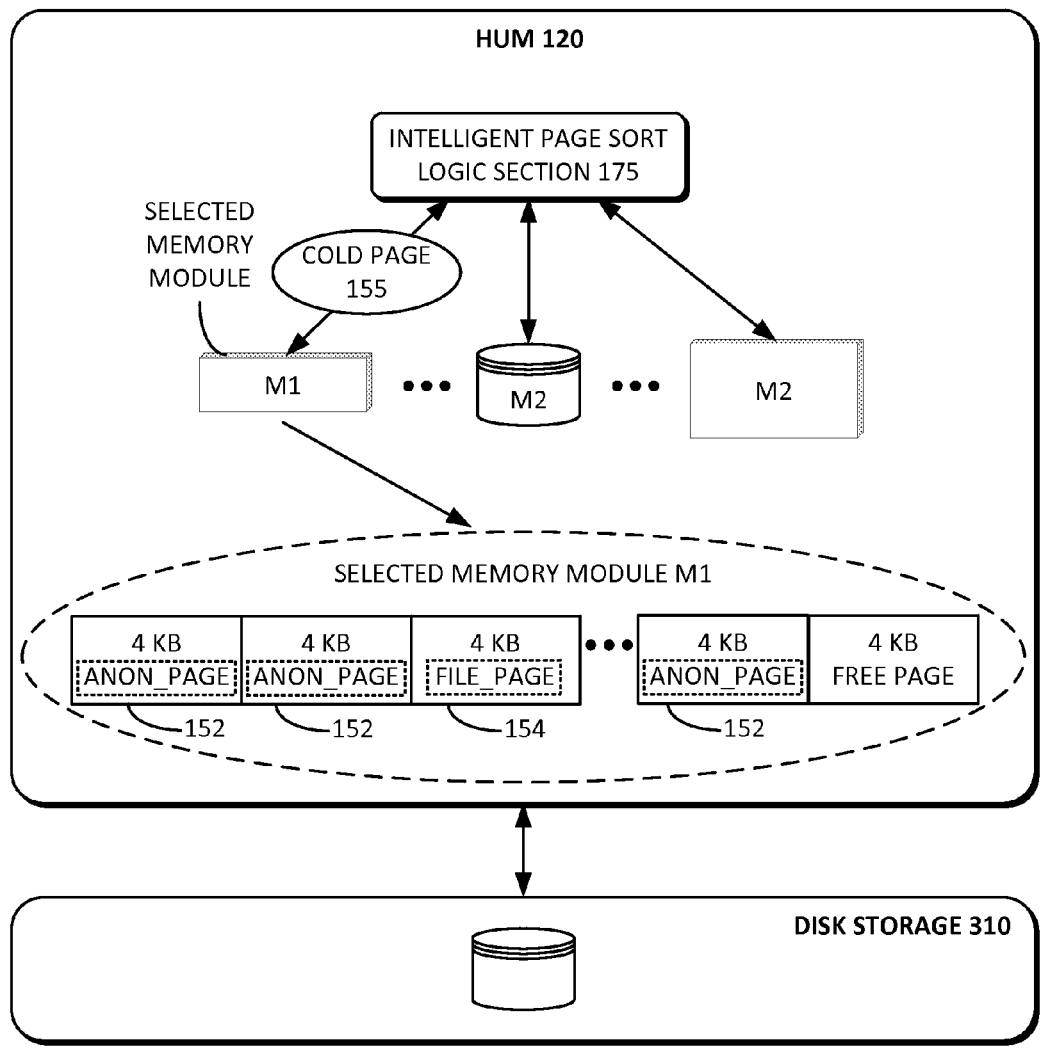
FIG. 3 is an example block diagram of the heterogeneous unified memory section of FIG. 1, including an operation of the intelligent page sort logic section in accordance with embodiments of the inventive concept.

FIG. 3 is an example block diagram of the heterogeneous unified memory section 120 of FIG. 1, including an operation of the intelligent page sort logic section 175 in accordance with embodiments of the inventive concept. The intelligent page sort logic section 175 can select a target memory module (e.g., M1) from among the physical heterogeneous memory modules. The intelligent page sort logic section 175 can determine whether each of the cold pages 155 is an anon-type memory page 152 or a file-type memory page 154. For each of the cold pages 155 corresponding to an anon-type memory page 152, the intelligent page sort logic section 175 can allocate the anon-type memory page 152 on the target memory module M1. For each of the cold pages 155 having the file-type memory page 154, the intelligent page sort logic section 175 can allocate a file-type memory page 154 on the target memory module M1. The selected memory module M1 can include anon-type memory pages only, file-type memory pages only, or a mixture of anon-type pages and file-type pages. The selected memory module M1 can include one or more free pages. In some embodiments, the page size is 4 kilobytes (KB). It will be understood that other suitable page sizes can be used. In some embodiments, a disk storage 310 can be communicatively coupled to the heterogeneous unified memory section 120. The intelligent page sort logic section 175 can cause the anon-type memory pages 152 and the file-type memory pages 154 to be written to and read from the disk storage 310. In an alternative embodiment, the storage space of the disk storage 310 can be a storage component of the extended unified memory 180 (of FIG. 2).

Figure 4:
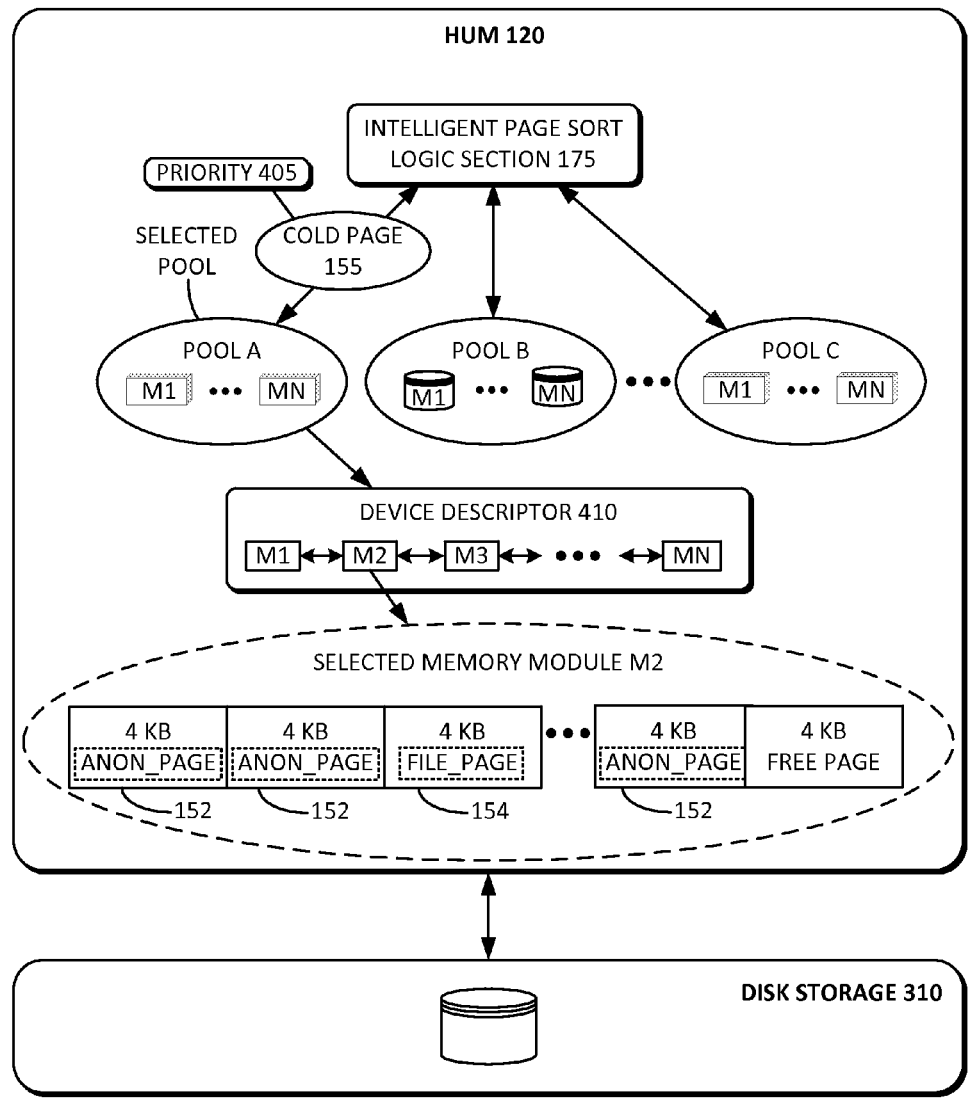
FIG. 4 is an example block diagram of the heterogeneous unified memory section of FIG. 1, including another example of an operation of the intelligent page sort logic section in accordance with embodiments of the inventive concept.

FIG. 4 is an example block diagram of the heterogeneous unified memory section 120 of FIG. 1, including another example operation of the intelligent page sort logic section 175 in accordance with embodiments of the inventive concept.

The intelligent page sort logic section 175 can select a pool (e.g., pool A) of memory modules from among various pools. For example, the intelligent page sort logic section 175 can select the pool A based at least on the characteristics of the pool A and/or the characteristics of the other pools (e.g., pools B and C). The characteristics can include performance characteristics, lifetime characteristics, wear resistance characteristics, power consumption characteristics, characteristics pertaining to the persistency of data in view of power failures, throughput characteristics, latency characteristics, or the like. For example, anon-type memory pages usually have a higher priority than file-type memory pages because failing to service an anon-type memory page can cause computerized systems to malfunction or freeze. Moreover, the intelligent page sort logic section 175 can select a pool based on an assigned priority 405 of the particular cold page 155.

Using a device descriptor 410, the intelligent page sort logic section 175 can select a target memory module (e.g., M2) from among the selected device pool (e.g., pool A) of memory modules from among the physical heterogeneous memory modules. The intelligent page sort logic section 175 can determine whether each of the cold pages 155 is an anon-type memory page 152 or a file-type memory page 154. For each of the cold pages 155 corresponding to an anon-type memory page 152, the intelligent page sort logic section 175 can allocate the anon-type memory page 152 on the target memory module M2. For each of the cold pages 155 having the file-type memory page 154, the intelligent page sort logic section 175 can allocate a file-type memory page 154 on the target memory module M2 (or other selected target memory module for the file-type memory pages 154). The selected memory module M2 can include anon-type memory pages only, file-type memory pages only, or a mixture of anon-type pages and file-type pages. The selected memory module M2 can include one or more free pages. In some embodiments, the page size is 4 kilobytes (KB). It will be understood that other suitable page sizes can be used. In some embodiments, a disk storage 310 can be communicatively coupled to the heterogeneous unified memory section 120. The intelligent page sort logic section 175 can cause the anon-type memory pages 152 and the file-type memory pages 154 to be written to and read from the disk storage 310.

For each of the cold pages 155 corresponding to the anon-type memory page 152, the intelligent page sort logic section 175 can write the anon-type memory page 152 to the target memory module M2. For each of the cold pages 155 corresponding to the file-type memory page 154, the intelligent page sort logic section 175 can write the file-type memory page 154 to the target memory module M2 (or other selected target memory module for the file-type memory pages 154).

Put differently, the intelligent page sort logic section 175 can distribute the first subset of memory pages corresponding to the anon-type memory pages 152 to the selected pool (e.g., pool A) of memory modules based at least on a set of characteristics of the selected pool of memory modules and/or other sets of characteristics of the other pools (e.g., pool B, pool C, etc.) of memory modules, and based at least on the assigned priority. Moreover, the intelligent page sort logic section 175 can distribute the second subset of memory pages corresponding to the file-type of memory pages 154 to the selected pool (e.g., pool A, or other selected pool for the file-type memory pages) of memory modules based at least on the set of characteristics of the selected pool of memory modules and/or other sets of characteristics of the other pools (e.g., pool B, pool C, etc.) of memory modules, and based at least on the assigned priority.

Figure 5:
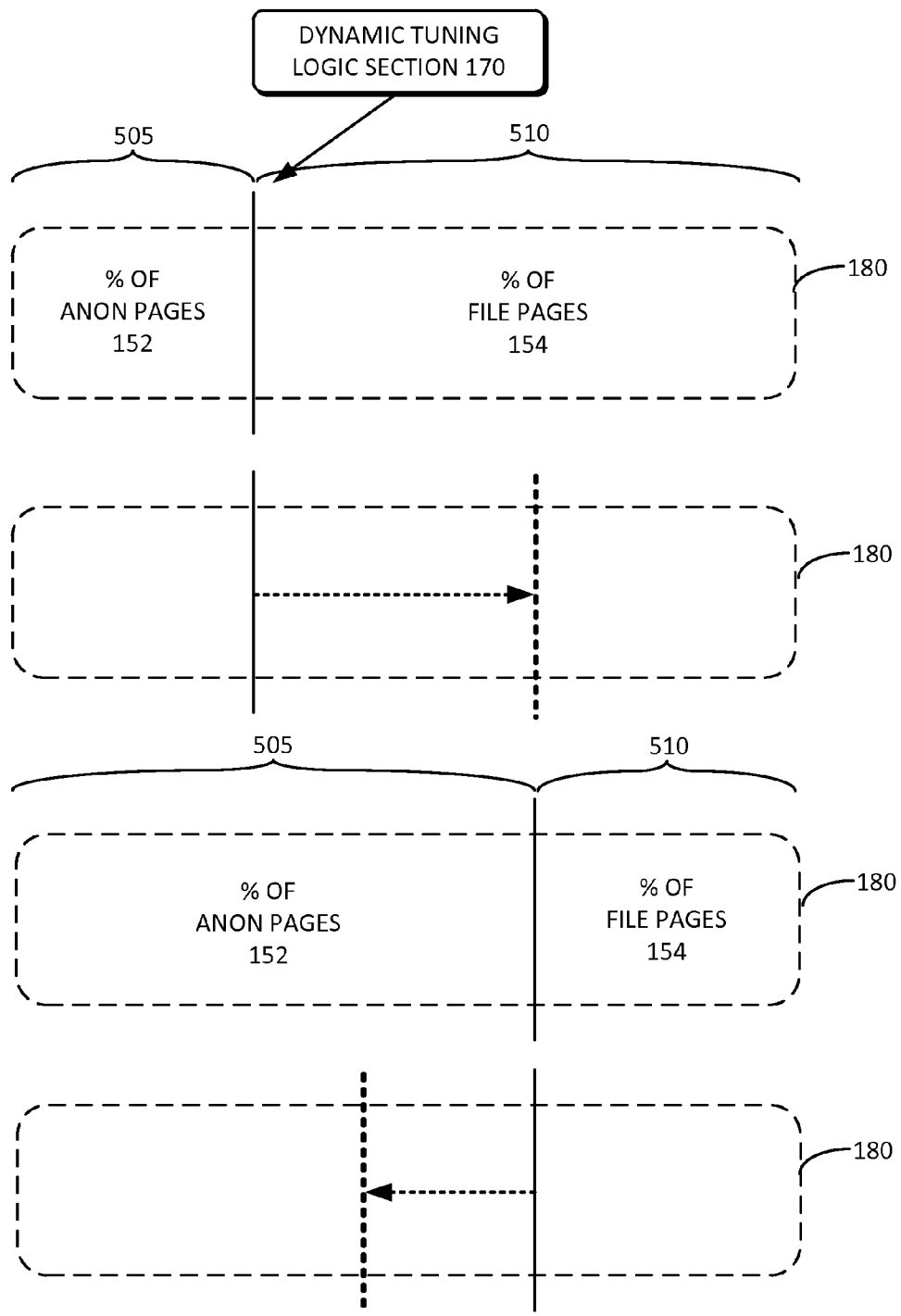
FIG. 5 is an example diagram of an operation of the dynamic tuning logic section of the heterogeneous unified memory section of FIG. 1 in accordance with embodiments of the inventive concept.

FIG. 5 is an example diagram of an operation of the dynamic tuning logic section 170 of the heterogeneous unified memory section 120 of FIG. 1 in accordance with embodiments of the inventive concept. The dynamic tuning logic section 170 can increase an amount of space 505 within the extended unified memory space 180 that is allocated for anon-type memory pages 152, and can decrease a corresponding amount of space 510 within the extended unified memory space 180 that is allocated for the file-type memory pages 154. In addition, the dynamic tuning logic section 170 can decrease an amount of space 505 within the extended unified memory space 180 that is allocated for anon-type memory pages 152, and can increase a corresponding amount of space 510 within the extended unified memory space 180 that is allocated for the file-type memory pages 154. In other words, a certain percentage 505 of the total extended unified memory space 180 can be allocated to anon-type memory pages and another percentage 510 of the total extended unified memory space 180 can be allocated to file-type memory pages. The combined percentages can equal 100 percent. Such individual percentages can be dynamically adjusted based at least on the number of anon-type memory pages needing to be serviced relative to the number of file-type memory pages.

Figure 6:
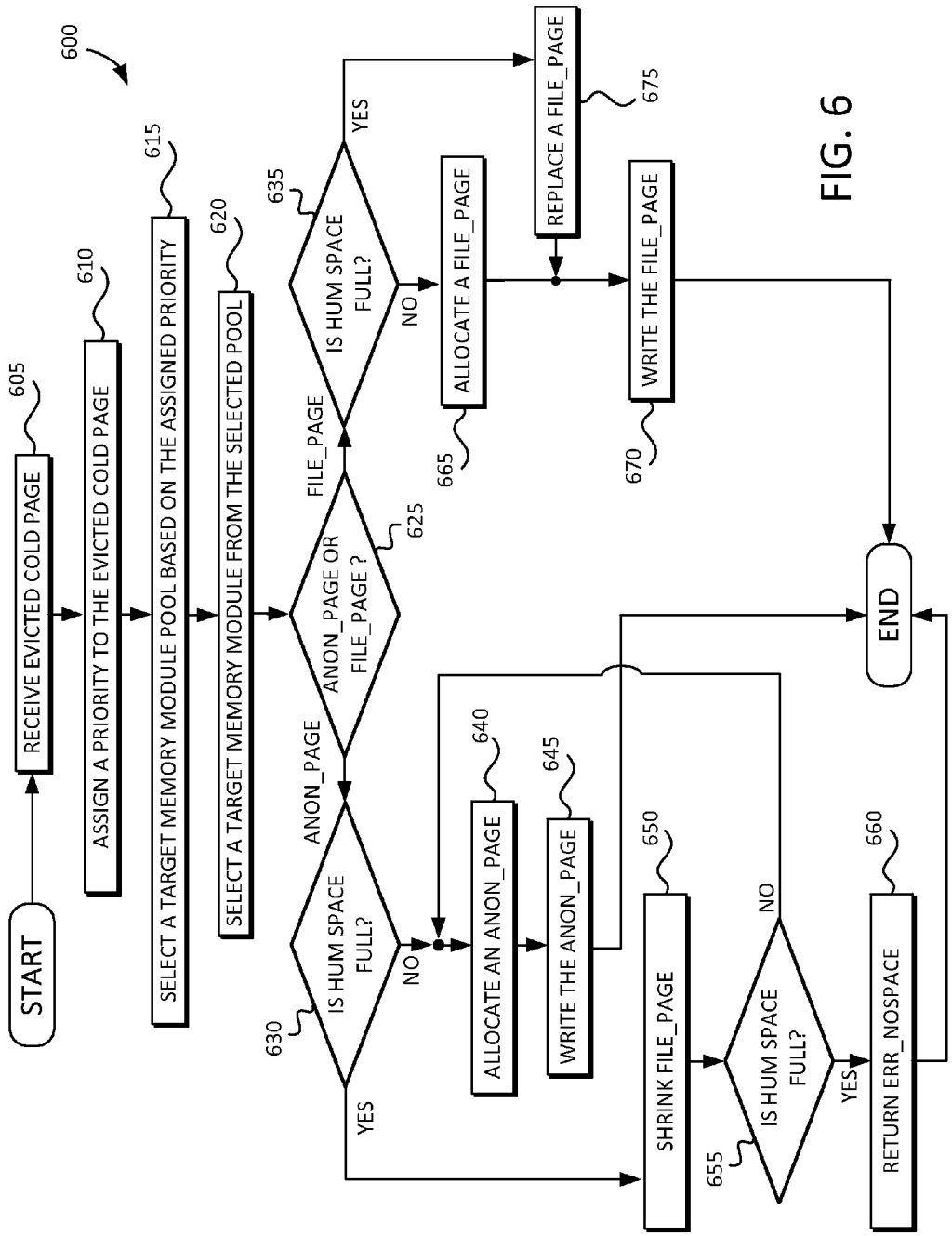
FIG. 6 is a flow diagram illustrating a cold page reclamation technique in accordance with embodiments of the inventive concept.

FIG. 6 is a flow diagram 600 illustrating a cold page reclamation technique in accordance with embodiments of the inventive concept. In other words, FIG. 6 shows the process of writing a victim memory page into the extended unified memory space 180. The technique begins at 605 where an evicted cold page (e.g., 155 of FIG. 1) is received by the cold page reclamation logic section (e.g., 160 of FIG. 1) from the system memory (e.g., 115 of FIG. 1). At 610, the cold page reclamation logic section 160 can assign a priority to the evicted cold page 155. At 615, the intelligent page sort logic section (e.g., 175 of FIG. 1) can select a target memory module pool (e.g., pool A, pool B, etc. in 180 of FIG. 1) based at least on the assigned priority and the characteristics of each pool. At 620, the intelligent page sort logic section 175 can select a target memory module from the selected pool.

A determination can be made at 625 of whether the evicted cold page is an anon-type memory page or a file-type memory page. In response to determining that the cold page is an anon-type memory page, the flow proceeds to 630, where another determination can be made whether the extended unified memory space 180 of the heterogeneous unified memory 120 is full or not with respect to anon space. If not full, the flow proceeds to 640 where an anon-type memory page can be allocated, and then to 645 where the anon-type memory page can be written to the extended unified memory space 180. Otherwise, if the extended unified memory space 180 of the heterogeneous unified memory 120 is full, the flow proceeds to 650 where an amount of space within the extended unified memory space that is allocated for the file-type memory pages can be shrunk or decreased, and a corresponding amount of space that is allocated for the anon-type memory pages can be dynamically increased.

After such adjustments, another determination can be made at 655 whether the extended unified memory space 180 of the heterogeneous unified memory 120 is full or not. If not full, the flow can proceed to 640 for allocation and writing of the anon-type file page. Otherwise, if full, the flow can return to 660 and an error message (e.g., ERR_NOSPACE) can be generated and returned to the application or extended library.

Referring back to the determination made at 625, if it is determined that the cold page 155 is a file-type memory page, the flow proceeds to 635 where another determination can be made whether the extended unified memory space 180 of the heterogeneous unified memory 120 is full or not with respect to available file space. If not full, the flow proceeds to 665 where a file-type memory page can be allocated, and then to 670 where the file-type memory page can be written to the extended unified memory space 180. Otherwise, if full, the flow proceeds to 675, where a file-type memory page can be replaced. For example, a least recently used (LRU) file-type memory page can be replaced with an evicted cold page (i.e., another file-type memory page in need of being stored). At 670, the evicted file-type memory page can be written to the extended unified memory space 180.

It will be understood that the elements and steps in the flow diagram 600 need not occur in the specific order as illustrated, but rather, can occur in a different order, or with intervening steps.

In the extended unified memory space 180, an allocation request for an anon-type memory page can be a higher priority than a file-type memory page, since failure to insert an anon-type memory page can cause the source application to malfunction or be killed. On the other hand, failure to insert a file-type memory page might only impact performance for I/O workloads. Preferably, the heterogeneous unified memory 120 does not let allocation requests of anon-type memory pages to wait. If the extended unified memory 180 is under high utilization, the new allocations of file-type memory pages can be forbidden so as to avoid impacting allocation requests for anon-type memory pages. In such a situation, a least recently used (LRU) file-type memory page can be replaced to facilitate insertion of a new file-type memory page. To achieve this, all file-type memory pages can be inserted into an LRU list and managed accordingly. During a read operation, any hit to a particular file-type memory page can promote such file-type memory page to the most recently used (MRU) position within the list.

In an alternative embodiment, the file branch of 625 can have a process that essentially mimics the anon-space side branch. In other words, in the alternative embodiment, in response to determining that the extended unified memory space 180 is full at 635, an amount of space within the extended unified memory space 180 that is allocated for the anon-type memory pages can be shrunk or decreased, and a corresponding amount of space that is allocated for the file-type memory pages can be dynamically increased. After such adjustments, another determination can be made whether the extended unified memory space 180 of the heterogeneous unified memory 120 is full or not. If not full, the file-type file page can be allocated and written. Otherwise, if full, an error message (e.g., ERR_NOSPACE) can be generated and returned to the application or extended library.

Figure 7:
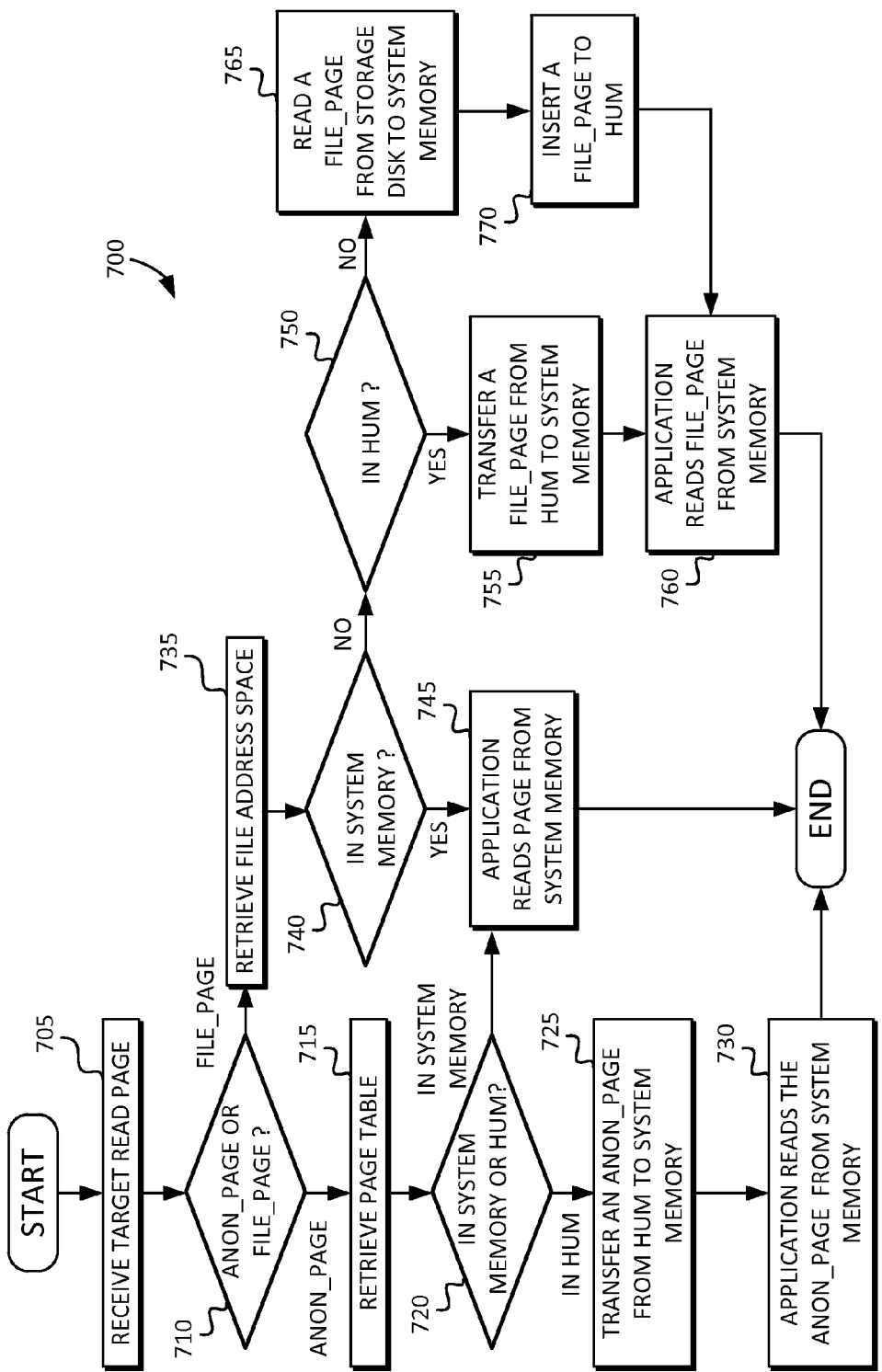
FIG. 7 is a flow diagram illustrating a memory page reading technique in accordance with embodiments of the inventive concept.

FIG. 7 is a flow diagram 700 illustrating a memory page reading technique in accordance with embodiments of the inventive concept. In other words, FIG. 7 shows the process of reading a memory page from the extended unified memory 180. The technique begins at 705 where a target read page is received, for example, by the heterogeneous unified memory 120. A determination can then be made at 710 by the intelligent page sort logic section (e.g., 175 of FIG. 1) whether the target read page is an anon-type memory page or a file-type memory page. If it is determined to be an anon-type memory page, the flow proceeds to 715 where a page table can be retrieved. Another determination can be made at 720, based on the page table, whether the target read page (i.e., the anon-type memory page) is located in the system memory (e.g., 115 of FIG. 1) or in the extended unified memory space 180. If located in the extended unified memory space 180, the flow proceeds to 725 where an anon-type memory page can be transferred from the extended unified memory space 180 to the system memory 115, after which an application (e.g., 130 of FIG. 1) or external library (e.g., 140 of FIG. 1) can read at 730 the anon-type memory page from the system memory 115. Otherwise, if it is determined at 720 that the target read page (i.e., the anon-type memory page) is located in the system memory 115, the flow proceeds to 745 where the application (e.g., 130 of FIG. 1) or external library (e.g., 140 of FIG. 1) can read the anon-type memory page from the system memory 115.

Referring back to the determination made at 710, if it is determined that the target read page is a file-type memory page, the flow proceeds to 735, where a file address space is retrieved. A determination can be made at 740, based at least on the retrieved file address space, whether the target read page (i.e., the file-type memory page) is located in the system memory 115 or in the extended unified memory space 180. If the file-type memory page is determined to be located in the system memory 115, the flow proceeds to 745 where the application (e.g., 130 of FIG. 1) or external library (e.g., 140 of FIG. 1) can read the file-type memory page from the system memory 115. Otherwise, if it is determined that the file-type memory page is not located in the system memory 115, the flow proceeds to 750.

At 750, a determination can be made whether the target read page (i.e., the file-type memory page) is located in the extended unified memory space 180 of the heterogeneous unified memory 120. If YES, the flow proceeds to 755 where the file-type memory page can be transferred from the extended unified memory space 180 to the system memory 115, and then read at 760 by an application (e.g., 130 of FIG. 1) or the external library (e.g., 140 of FIG. 1) from the system memory 115. Otherwise, if NO, meaning that the target read page is located in neither the extended unified memory space 180 nor the system memory 115, the flow proceeds to 765 where a file-type memory page can be caused to be read from a storage disk (e.g., 310 of FIG. 3) and transferred to the system memory 115. At 770, the file-type memory page can be inserted into the extended unified memory space 180 of the heterogeneous unified memory 120.

It will be understood that the elements and steps in the flow diagram 700 need not occur in the specific order as illustrated, but rather, can occur in a different order, or with intervening steps.

Figure 8:
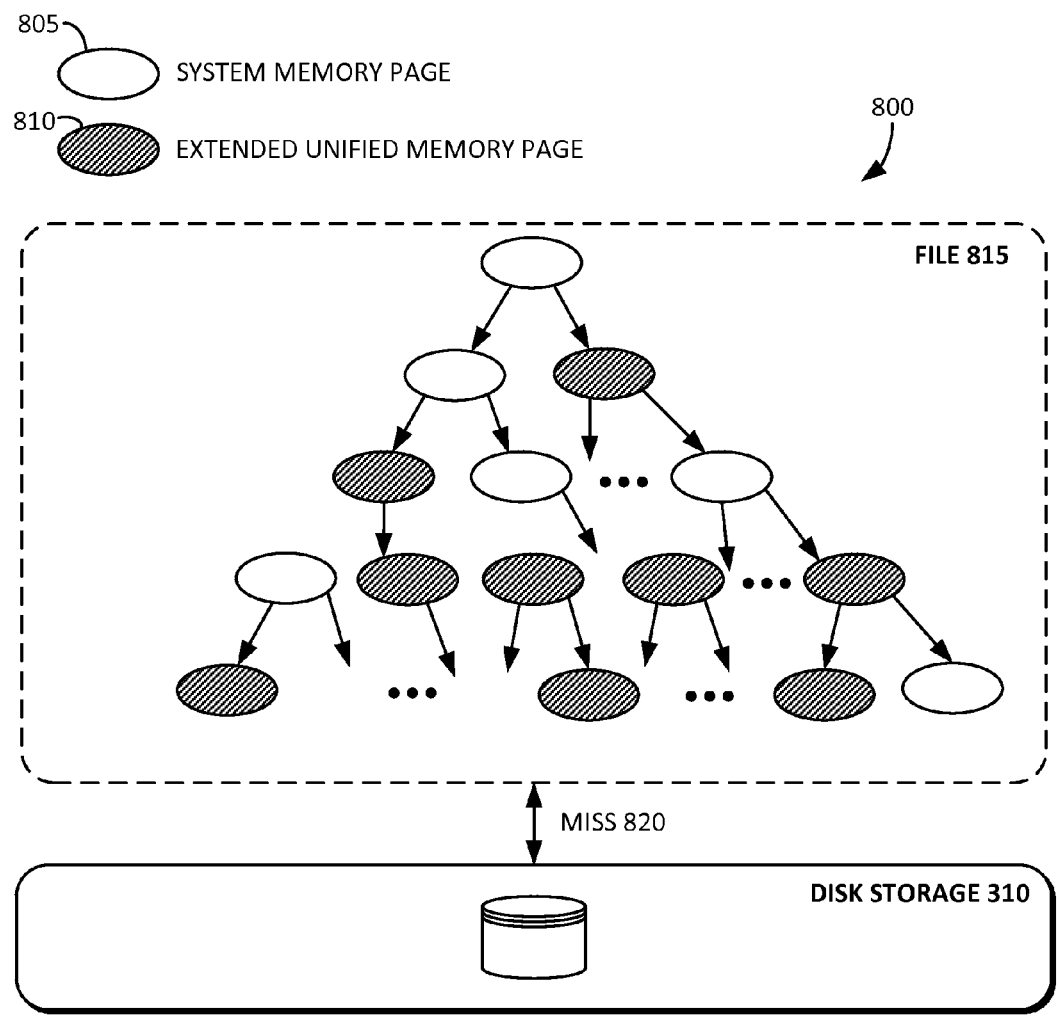
FIG. 8 is an example diagram of a file including components stored in system memory and the heterogeneous unified memory section in accordance with embodiments of the inventive concept.

FIG. 8 is an example diagram 800 of a file 815 including components stored in a system memory (e.g., 115 of FIG. 1) and the extended unified memory 180 of the heterogeneous unified memory section 120 in accordance with embodiments of the inventive concept. If the target read page is a file-type memory page, an extended file address space can be retrieved, which can index data within both the system memory space and the extended unified memory space. The file 815 can have one or more system memory pages 805 and one or more extended unified memory pages 810. In other words, the file 815 can include memory pages in both the system memory (e.g., 115 of FIG. 1) and the extended unified memory space (e.g., 180 of FIG. 1). The extended unified memory space 180 can store one or more memory pages associated with the file 815 simultaneously with the system memory 115 storing one or more different memory pages associated with the file 815.

If a memory page associated with the file 815 is attempted to be read, but does not exist in either the system memory 115 or the extended unified memory 180, then a miss 820 has occurred, and the target read page can be accessed from the disk storage 310. In other words, data can be read from the disk storage device 310 if the target read file page is not found in either the system memory or the extended file address space. In such case, the read request page can be asynchronously inserted into the extended unified memory space 180 to boost I/O performance for future access.

Figure 9:
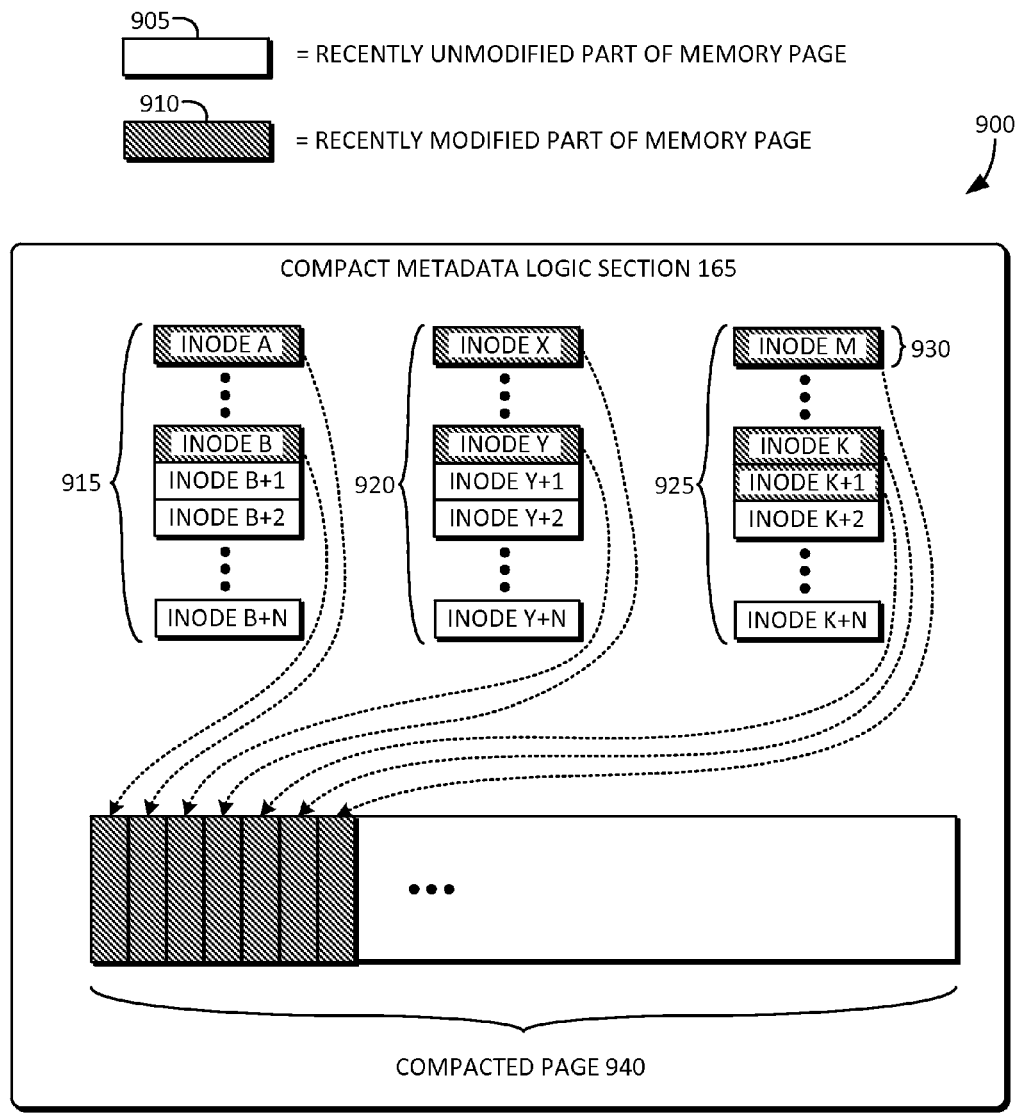
FIG. 9 is an example diagram of a compact metadata logic section and technique in accordance with embodiments of the inventive concept.

FIG. 9 is an example diagram 900 of a compact metadata logic section 165 and technique in accordance with embodiments of the inventive concept. The compact metadata logic section 165 of the heterogeneous unified memory section 120 can compress different recently modified parts 910 within metadata pages (e.g., 915, 920, and 925) from among the cold pages (e.g., 155 of FIG. 1) into a single compacted metadata page 940. The compact metadata logic section 165 can cause the single compacted metadata page to be stored in the extended unified memory space 180 (of FIG. 1).

Each of the metadata pages (e.g., 915, 920, and 925) can include recently modified parts 910 and recently unmodified parts 905. For example, a part 930 of the metadata page 925 can be recently modified. In some embodiments, each part (e.g., 930) can be a 128 byte value within the larger 4 KB memory page. It will be understood that each part (e.g., 930) need not be 128 bytes, but can be of different sizes. It will also be understood that the compacted memory page 940 need not be 4 KB, but can be of a different size. Preferably, the size of the compacted memory page 940 is a mathematical multiple of the size of the part 930.

The various metadata pages can include, for example, inodes. For example, the metadata page 915 can include inode A, B, B+1, B+2, through B+N. By way of another example, the metadata page 920 can include inode X, Y, Y+1, Y+2, through Y+N. By way of yet another example, the metadata page 925 can include inode M, K, K+1, K+2, through K+N. Each inode can correspond to an individual part (e.g., 930), whether recently modified or recently unmodified. The compacted page 940 can include various inodes or parts from multiple different metadata memory pages (e.g., 915, 920, and 925).

With conventional technologies, disk-cache solutions are implemented at a generic block layer. As a result, they have no specific information about the cached data. The inserted data are written to the caching devices exactly as what are passed through. As a result, even when there are very small updates on a 4 KB page, for example, the conventional disk-cache approaches have to write a complete 4 KB block to the caching devices. Such conventional approaches are particularly disadvantageous because flash and/or SSD memory storage devices can be used as the disk-caches, and such devices have limited write endurance and potentially reduced write performance.

Using embodiments of the inventive concept, information of a file system layer can be leveraged so as to reduce the unnecessary writes to the extended physical heterogeneous memory modules (e.g., space used for file-type memory pages). As a result, only actual modified parts can be written to the extended unified memory space 180, which reduces the overall number of writes, and consequently, improves performance while also conserving wear and tear and improving lifetime of the memory modules themselves.

FIGS. 10-15 are schematic diagrams of various devices in which the heterogeneous unified memory section of FIG. 1 can be embedded, in accordance with embodiments of the inventive concept.

Figure 10:
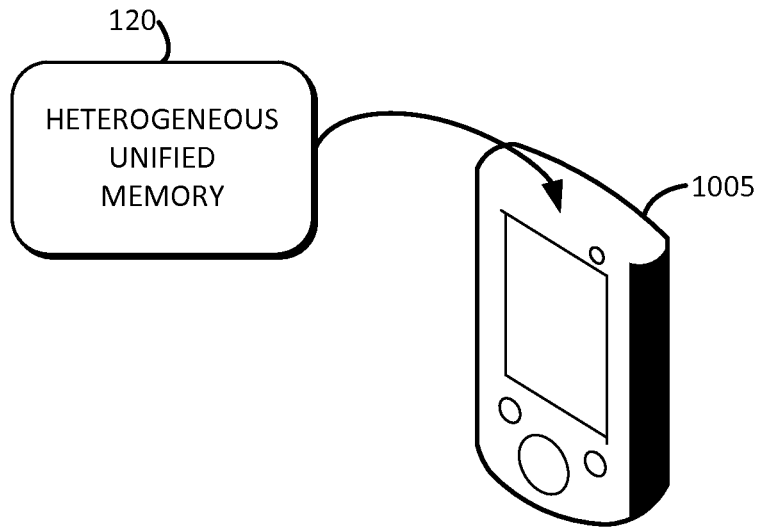
FIGS. 10-15 are schematic diagrams of various devices in which the heterogeneous unified memory section of FIG. 1 can be embedded, in accordance with embodiments of the inventive concept.
Figure 11:
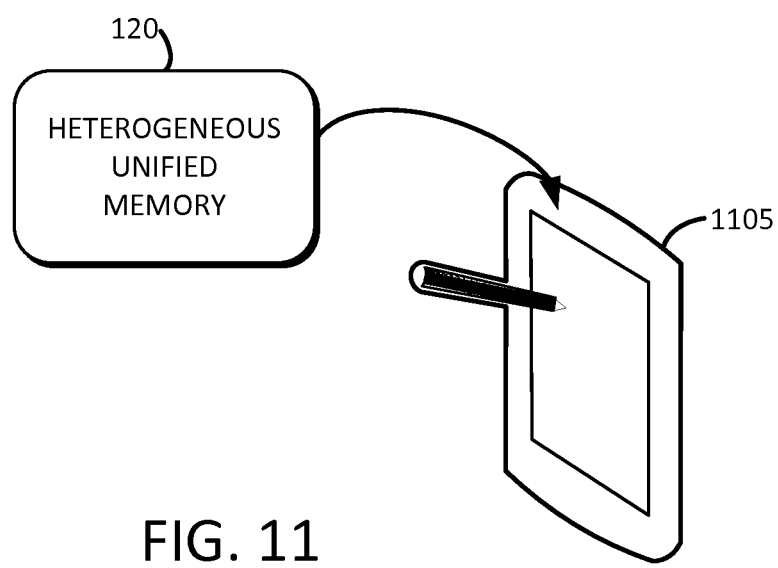
Figure 12:
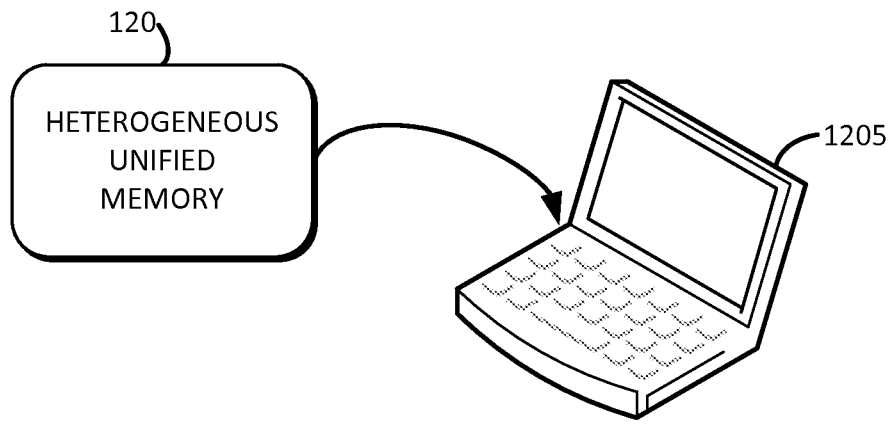
Figure 13:
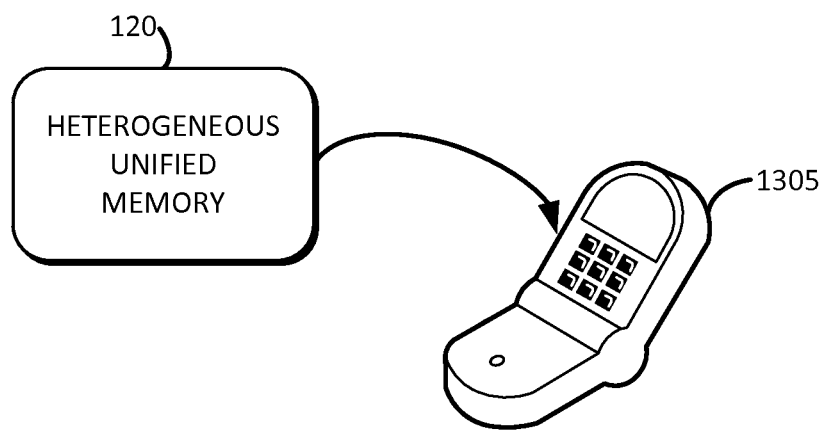
Figure 14:
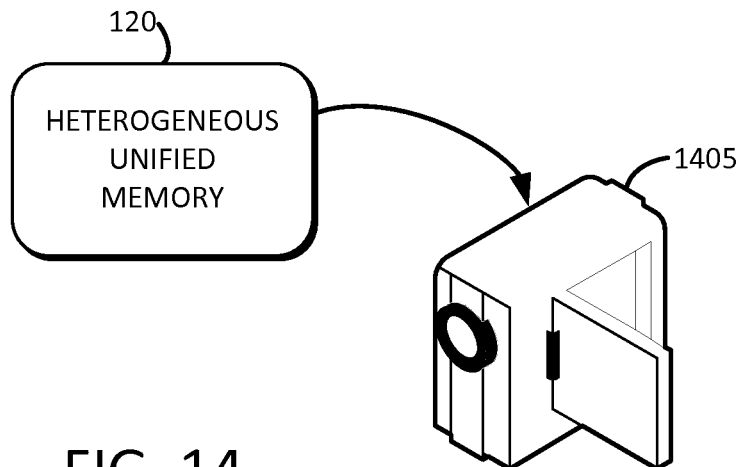
Figure 15:
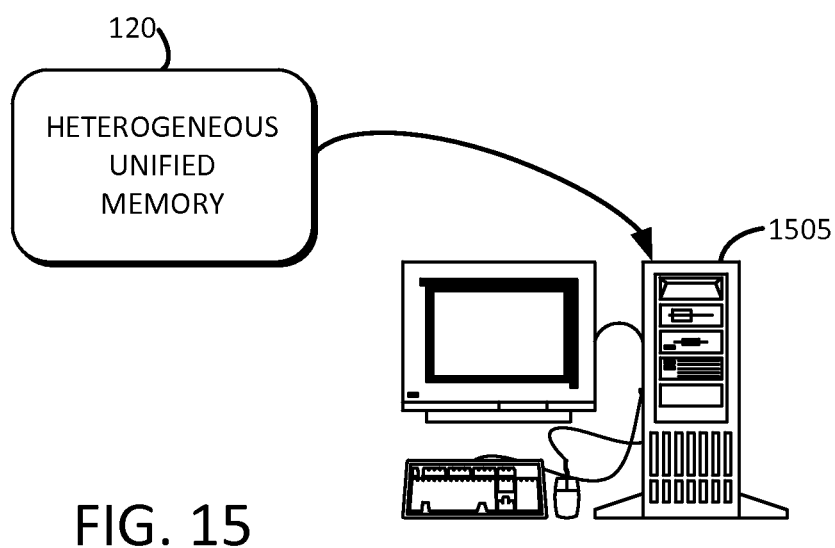

For example, as can be seen in FIG. 10, smart phone 1005 can include the heterogeneous unified memory section 120, as described in detail above. Similarly, the tablet 1105 shown in FIG. 11, the notebook computer 1205 shown in FIG. 12, the mobile phone 1305 shown in FIG. 13, the camera 1405 shown in FIG. 14, and the desktop computer 1505 shown in FIG. 15 can include the heterogeneous unified memory section 120, as described in detail above. It will be understood that any suitable computerized device that uses one or more memory devices can include or otherwise operate with the heterogeneous unified memory section 120, as described in detail above.

Figure 16:
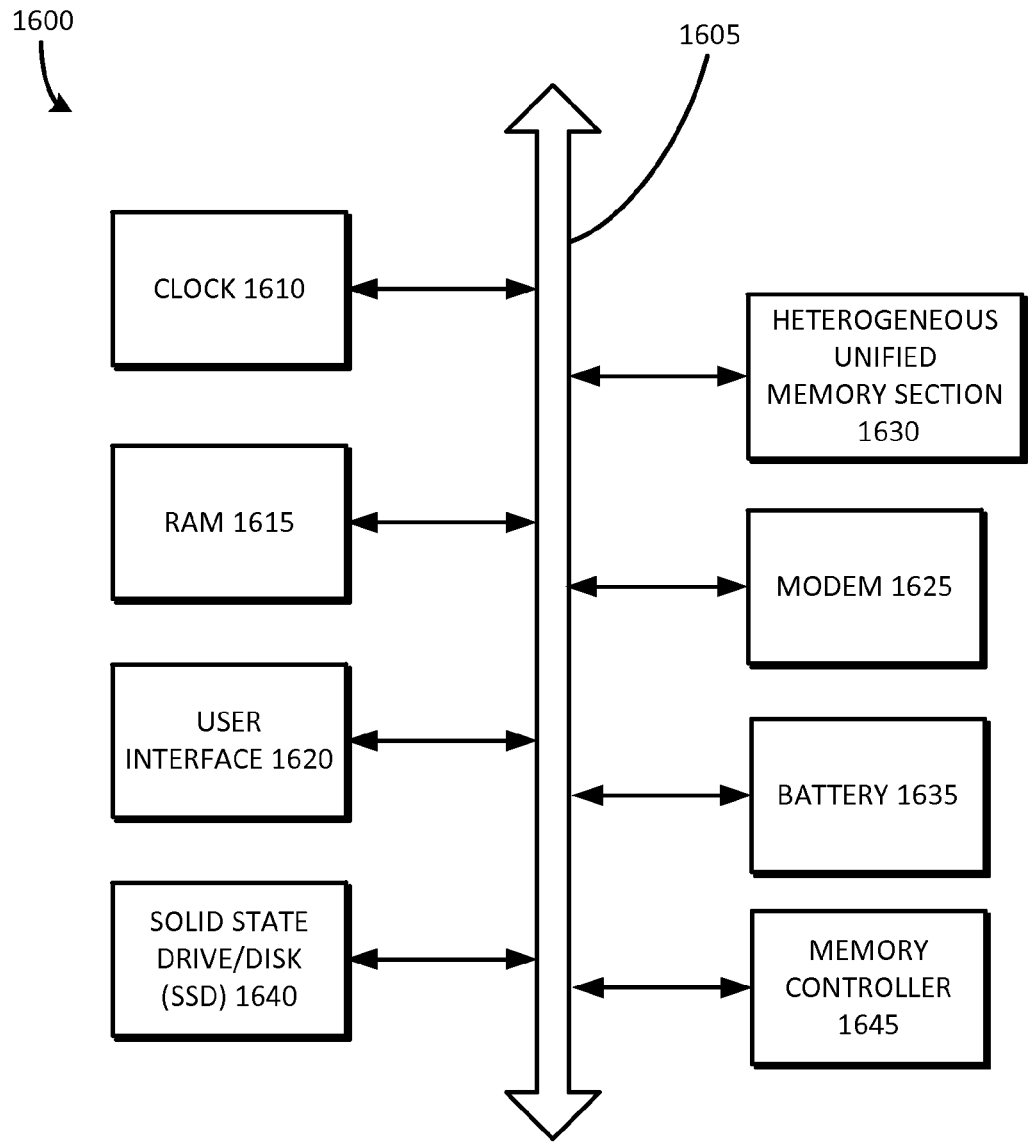
FIG. 16 is a block diagram of a computing system including the heterogeneous unified memory section of FIG. 1 according to embodiments of the inventive concept as disclosed herein.

FIG. 16 is a block diagram of a computing system 1600 including the heterogeneous unified memory section 1630 (e.g., corresponding to 120 of FIG. 1) according to embodiments of the inventive concept as disclosed herein.

Referring to FIG. 16, the computing system 1600 may also include a clock 1610, a random access memory (RAM) 1615, a user interface 1620, a modem 1625 such as a baseband chipset, a solid state drive/disk (SSD) 1640, a memory controller 1645, and/or a battery 1635, any or all of which may be electrically coupled to a system bus 1605. The heterogeneous unified memory section 1630 can correspond to 120 described in detail above, and as set forth herein, and may also be electrically coupled to the system bus 1605.

If the computing system 1600 is a mobile device, the battery 1635 can power the computing system 1600. Although not shown in FIG. 16, the computing system 1600 may further include an application chipset, a camera image processor (CIS), a mobile DRAM, and the like.

In example embodiments, the computing system 1600 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A heterogeneous unified memory section, comprising:
an extended unified memory space across a plurality of physical heterogeneous memory modules;
a cold page reclamation logic section configured to receive and prioritize a plurality of cold pages from a system memory, the plurality of cold pages including a first subset of memory pages having a first type of memory data and a second subset of memory pages having a second type of memory data;
a dynamic tuning logic section configured to manage space allocation within the extended unified memory space between the first subset of memory pages having the first type of memory data and the second subset of pages having the second type of memory data; and
an intelligent page sort logic section configured to distribute the plurality of cold pages among at least a first pool of memory modules from among the plurality of physical heterogeneous memory modules and a second pool of memory modules from among the plurality of physical heterogeneous memory modules, the first pool of memory modules having a first set of characteristics, and the second pool of memory modules having a second set of characteristics.

2. The heterogeneous unified memory section of claim 1, wherein the first type of memory data corresponds to anon-type memory pages and the second type of memory data corresponds to file-type memory pages.

3. The heterogeneous unified memory section of claim 2, wherein the extended unified memory space includes a single unified logical memory space that spans the plurality of physical heterogeneous memory modules, and that is configured to store the anon-type memory pages and the file-type memory pages.

4. The heterogeneous unified memory section of claim 1, wherein the plurality of physical heterogeneous memory modules includes at least one non-volatile memory module.

5. The heterogeneous unified memory section of claim 1, wherein the plurality of physical heterogeneous memory modules includes at least one of a spin-transfer torque magnetoresistive random-access memory (STT MRAM), a solid state drive (SSD), a flash memory, a resistive type memory, a phase change memory (PCM), or a dynamic random-access memory (DRAM).

6. The heterogeneous unified memory section of claim 1, wherein:
the first type of memory data corresponds to anon-type memory pages;
the second type of memory data corresponds to file-type memory pages;
the cold page reclamation logic section is configured to assign a priority to each of the plurality of cold pages;
the intelligent page sort logic section is configured to select one of the first pool of memory modules or the second pool of memory modules based at least on the first set of characteristics of the first pool of memory modules and the second set of characteristics of the second pool of memory modules, and based at least on the assigned priority of each of the plurality of cold pages;
the intelligent page sort logic section is configured to select a target memory module from among the selected device pool of memory modules from among the plurality of physical heterogeneous memory modules;
the intelligent page sort logic section is configured to determine whether each of the cold pages is the anon-type memory page or the file-type memory page;
for each of the cold pages corresponding to the anon-type memory page, the intelligent page sort logic section is configured to allocate the anon-type memory page on the target memory module; and
for each of the cold pages corresponding to the file-type memory page, the intelligent page sort logic section is configured to allocate the file-type memory page on the target memory module.

7. The heterogeneous unified memory section of claim 6, wherein:
for each of the cold pages corresponding to the anon-type memory page, the intelligent page sort logic section is configured to write the anon-type memory page to the target memory module; and
for each of the cold pages corresponding to the file-type memory page, the intelligent page sort logic section is configured to write the file-type memory page to the target memory module.

8. The heterogeneous unified memory section of claim 6, wherein:
the intelligent page sort logic section is configured to distribute the first subset of memory pages corresponding to the anon-type memory pages to the selected first or second pool of memory modules based at least on the first set of characteristics of the first pool of memory modules and the second set of characteristics of the second pool of memory modules, and based at least on the assigned priority; and
the intelligent page sort logic section is configured to distribute the second subset of memory pages corresponding to the file-type of memory pages to the selected first or second pool of memory modules based at least on the first set of characteristics of the first pool of memory modules and the second set of characteristics of the second pool of memory modules, and based at least on the assigned priority.

9. The heterogeneous unified memory section of claim 1, wherein:
the dynamic tuning logic section is configured to increase an amount of space within the extended unified memory space that is allocated for the memory pages having the first type of memory data, and to decrease a corresponding amount of space within the extended unified memory space that is allocated for the memory pages having the second type of memory data.

10. The heterogeneous unified memory section of claim 1, wherein:
the dynamic tuning logic section is configured to decrease an amount of space within the extended unified memory space that is allocated for the memory pages having the first type of memory data, and to increase a corresponding amount of space within the extended unified memory space that is allocated for the memory pages having the second type of memory data.

11. The heterogeneous unified memory section of claim 1, wherein:
the extended unified memory space is configured to store one or more memory pages associated with a particular file simultaneously with the system memory storing one or more different memory pages associated with the particular file.

12. The heterogeneous unified memory section of claim 1, further comprising:
a compact metadata logic section configured to:
compress different modified parts within metadata pages from among the plurality of cold pages into a single compacted metadata page; and
cause the single compacted metadata page to be stored in the extended unified memory space.

13. A computer-implemented method for managing an extended unified memory space across a plurality of physical heterogeneous memory modules, the method comprising:
receiving, by a cold page reclamation logic section, an evicted cold page from a system memory;
assigning, by the cold page reclamation logic section, a priority to the evicted cold page;
selecting, by an intelligent page sort logic section, one of a first pool of memory modules from among the plurality of physical heterogeneous memory modules or a second pool of memory modules from among the plurality of physical heterogeneous memory modules based at least on a first set of characteristics of the first pool of memory modules and a second set of characteristics of the second pool of memory modules, and based at least on the assigned priority of the evicted cold page; and
selecting a target module from among the selected pool of memory modules.

14. The computer-implemented method of claim 13, further comprising:

determining, by the intelligent page sort logic section, whether the evicted cold page has a first type of memory data or a second type of memory data;

determining, by the intelligent page sort logic section, whether the extended unified memory space is full or not full;

in response to determining that the evicted cold page has the first type of memory data and that the extended unified memory space is not full, allocating a memory page on the target memory module and writing the evicted cold page having the first type of memory data to the target memory module; and in response to determining that the evicted cold page has the second type of memory data and that the extended unified memory space is not full, allocating a memory page on the target memory module and writing the evicted cold page having the second type of memory data to the target memory module.

15. The computer-implemented method of claim 14, wherein the first type of memory data corresponds to an anon-type memory page, and the second type of memory data corresponds to a file-type memory page, the method further comprising:

in response to determining that the evicted cold page is the anon-type memory page and that the extended unified memory space is not full, allocating the anon-type memory page on the target memory module and writing the anon-type memory page to the target memory module; and in response to determining that the evicted cold page is the file-type memory page and that the extended unified memory space is not full, allocating the file-type memory page on the target memory module and writing the file-type memory page to the target memory module.

16. The computer-implemented method of claim 14, in response to determining that the evicted cold page has the first type of memory data and that the extended unified memory space is full, increasing an amount of space within the extended unified memory space that is allocated for memory pages having the first type of memory data, and decreasing a corresponding amount of space within the extended unified memory space that is allocated for memory pages having the second type of memory data; and in response to determining that the evicted cold page has the second type of memory data and that the extended unified memory space is full, replacing a least recently used (LRU) file-type memory page with the evicted cold page having the second type of memory data.

17. A computer-implemented method for managing an extended unified memory space across a plurality of physical heterogeneous memory modules, the method comprising:

managing an extended unified memory space across a plurality of physical heterogeneous memory modules;

receiving a target read page from a system memory;

determining, by an intelligent page sort logic section, whether the target read page corresponds to an anon-type memory page or a file-type memory page;

in response to determining that the target read page corresponds to the anon-type memory page:

retrieving a page table;

determining whether the anon-type memory page is located in a system memory or in the extended unified memory space based on the page table; and in response to determining that the anon-type memory page is located in the extended unified memory space, transferring the anon-type memory page from the extended unified memory space to the system memory;

in response to determining that the target read page corresponds to the file-type memory page:

retrieving a file address space;

determining whether the file-type memory page is located in the system memory or in the extended unified memory space based on the retrieved file address space; and in response to determining that the file-type memory page is located in the extended unified memory space, transferring the file-type memory page from the extended unified memory space to the system memory.

18. The computer-implemented method of claim 17, further comprising:

in response to determining that the file-type memory page is located in neither the extended unified memory space nor the system memory:

causing the file-type memory page to be transferred from a storage disk to the system memory; and inserting the file-type memory page into the extended unified memory space.

* * * * *